United States Patent [19]

Pennington

[11] Patent Number: 4,642,446

[45] Date of Patent: Feb. 10, 1987

[54] LASER WELDING OF GALVANIZED STEEL

[75] Inventor: Edward J. Pennington, Pleasanton, Calif.

[73] Assignee: General Motors Corporation, Detroit, Mich.

[21] Appl. No.: 783,687

[22] Filed: Oct. 3, 1985

[51] Int. Cl.[4] .............................................. B23K 26/00
[52] U.S. Cl. ...................... 219/121 LD; 219/121 ED; 219/121 LM; 219/137 WM; 428/659
[58] Field of Search .................. 219/121 LC, 121 LD, 219/121 EC, 121 ED, 121 LM, 137 WM, 118, 99, 100; 428/659, 683

[56] References Cited

U.S. PATENT DOCUMENTS

| | | | |
|---|---|---|---|
| 3,798,406 | 3/1974 | Becker | 219/121 LD |
| 3,969,604 | 7/1976 | Baardsen | 219/121 LD |
| 4,416,737 | 11/1983 | Austin et al. | 204/28 |
| 4,480,166 | 10/1984 | Leech | 219/118 |

FOREIGN PATENT DOCUMENTS

| | | | |
|---|---|---|---|
| 0125382 | 7/1983 | Japan | 219/121 LD |
| 0147774 | 8/1984 | Japan | 219/121 LD |
| 0593757 | 12/1977 | Switzerland | 219/121 LD |

OTHER PUBLICATIONS

Metals Handbook, vol. 6, pp. 793–803, "Welding Brazing and Soldering".

*Primary Examiner*—M. H. Paschall
*Attorney, Agent, or Firm*—Douglas D. Fekete

[57] ABSTRACT

An improved method is disclosed for producing a welded joint between galvanized steel sheet members utilizing a laser beam or the like. Surface regions of the galvanized member in the weld zone are selectively pretreated to remove the zinc coating and apply a nickel-base coating. The nickel coating avoids the vaporization problems associated with zinc, while providing suitable corrosion protection in the welded joint.

2 Claims, 2 Drawing Figures

LASER WELDING OF GALVANIZED STEEL

BACKGROUND OF THE INVENTION

This invention relates to welding zinc-coated steel sheet using a high energy density beam, such as a laser beam or the like. More particularly, this invention relates to a method for laser welding an assembly comprising at least one zinc-coated steel sheet, wherein, prior to the welding operation, the zinc coating is selectively removed from surfaces in the weld-affected zone and replaced by a nickel coating to reduce weld porosity and provide corrosion protection.

In a typical laser welding operation to join steel sheet members, the members are assembled with faying surfaces in contact, and an external surface opposite the faying surfaces is scanned by a laser beam. The laser beam cuts a keyhole in the members, surrounded by molten metal. After the beam passes, the molten metal fills the keyhole and fuses to form the weld. The laser produces intense heating that permits the weld to be completed in a very short time, on the order of a fraction of a second for a spot weld. In a related laser cladding process, a surface is scanned while depositing a powdered metal, whereupon the powdered metal melts and coalesces to form a coating. An advantage of laser processing is that effects of heating may be limited to a narrow zone immediately about the scanned surface.

Galvanized steel sheet comprises a thin metallic zinc coating for corrosion protection. Zinc has sacrificial properties when applied to steel that make it particularly effective for combating corrosion. However, a major problem is encountered when attempting to weld galvanized steel sheet because the zinc vaporizes at steel fusion temperatures. Zinc vaporization is particularly violent during laser welding because of the intense heating. In addition, because of the rapid rate at which the weld is formed, zinc vapors at the faying surfaces create porosity in the weld nugget that reduces the integrity of the weld. Zinc vaporizing from external surfaces exposes the underlying steel to corrosion.

Accordingly, it is an object of this invention to provide an improved method for welding a zinc-coated thin steel member using a high energy density beam, such as a laser beam, which method includes treating the member prior to welding to replace the zinc coating on selected surface regions with a coating composed of a metal that does not vaporize appreciably at steel fusion temperatures. This coating substitution is effectuated by a single cladding operation and confined to a narrow region immediately about the intended weld. During welding, the substitute coating fuses with the steel to form a sound nugget, in marked contrast to the high porosity produced by violent zinc vaporization. In one aspect, the welded product may be formed between readily available galvanized steel sheet. The zinc coating substantially covers the product to provide preferred corrosion protection, while the substitute coating provides protection at the weld joint.

SUMMARY OF THE INVENTION

In accordance with a preferred embodiment of this invention, selected surface regions of galvanized steel sheet members are prepared for laser welding by removing the zinc coating and concurrently applying a nickel-base coating. The recoated regions include a faying region of each member and an external region opposite the faying surface. The regions are initially scanned by a laser beam having an intensity sufficient to vaporize zinc without major incipient melting of the steel substrate. As the beam scans the surface, fine powdered nickel is injected into the beam and deposits onto the surface. The beam melts the nickel, whereupon the powdered nickel coalesces to form a coating. The substitute coating is predominantly nickel, but may contain unvaporized zinc, particularly in peripheral areas.

Thereafter, the members are arranged for joining and scanned by a second laser beam to weld the members into a product structure. This second beam is projected onto the external surface region of one member and has an intensity sufficient to fuse steel at the faying regions. The product weld exhibits a high integrity, characteristic of a comparable weld formed between bare steel members. At the faying surfaces, melting nickel fuses with the steel and becomes incorporated into the weld nugget. At the irradiated surface, the nickel adjacent the beam melts and flows to produce a nickel-enriched layer on the weld nugget.

Thus, the welded structure produced by this invention is preferably formed of galvanized sheet steel that is readily available and relatively inexpensive. Except for the weld-affected zone, the zinc coating is undisturbed and substantially protects the structure against corrosion. Although zinc is preferred over nickel for corrosion protection, the nickel-enriched layer overlying the weld-affected zone provides a suitable measure of protection in this limited region. Furthermore, the method of this invention provides a high integrity welded joint between the members, without the excessive porosity typically found in laser welds formed between zinc-coated surfaces.

DESCRIPTION OF THE DRAWINGS

The present invention will be further illustrated with reference to the drawings wherein.

DETAILED DESCRIPTION OF THE INVENTION

Figure 1:
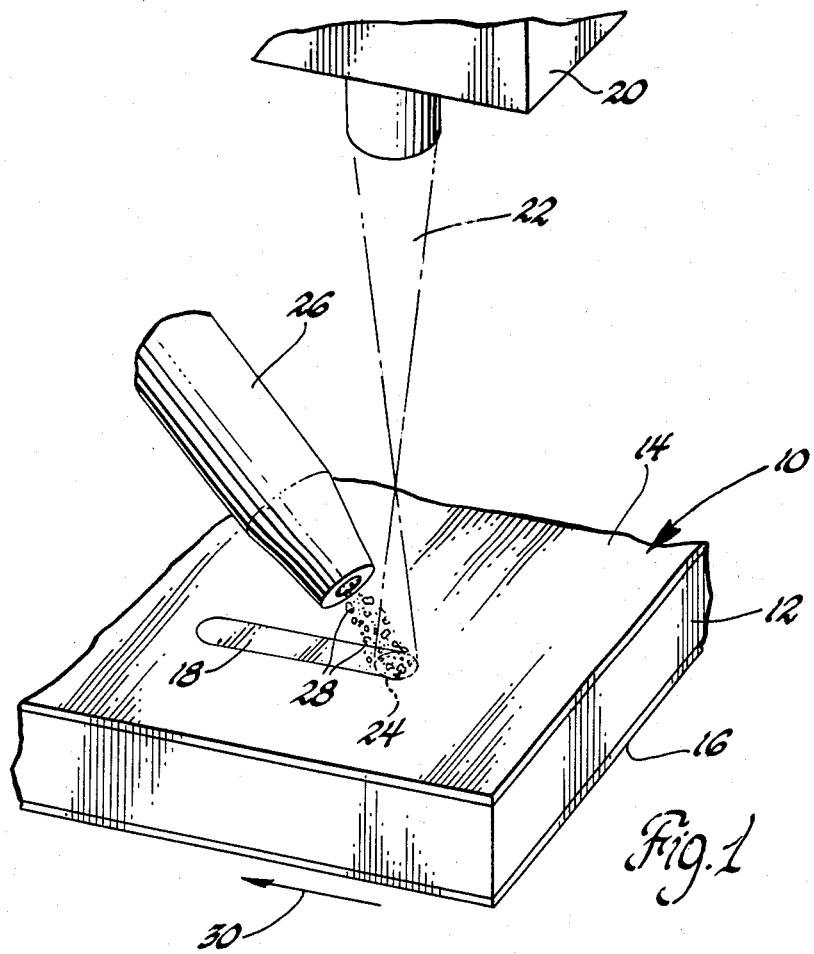
FIG. 1 is an enlarged perspective diagrammatic view, exaggerated for clarity, of a partial recladding operation on galvanized steel sheet in preparation for welding in accordance with this invention.

In a preferred embodiment, this invention is employed for forming a lap joint between galvanized steel sheet members. Referring to FIG. 1, one such member 10 is shown and comprises a steel sheet substrate 12 having zinc coatings 14 and 16 on the major faces thereof. Member 10 has a thickness of about 0.037 inch, whereas coatings 14 and 16 are about 0.005 inch thick. In accordance with this invention, a portion of zinc coating 14 is removed and replaced with a nickel-base coating 18 in a laser cladding pretreatment. The pretreatment is carried out utilizing a continuous-wave, carbon dioxide laser apparatus 20 commercially available from Spectrophysics, Inc., under the designation Model 975, and having a 5 kilowatt power rating. Apparatus 20 generates a laser beam 22 focused by a 7.5 inch focal length lens. Beam 22 is directed onto the coated surface of member 10, which is positioned so that the focal point is spaced above the member and a diffuse, nonoscillating pattern 24 appears on the surface. Pattern 24 is about 0.19 inch in diameter. A tube 26 directs a helium gas stream carrying high purity fine nickel powder 28 into the beam pattern proximate to the member surface.

During the recladding operation, member 10 advanced in the direction of arrow 30, perpendicular to beam 22, so that pattern 24 scans the surface. The intensity of the defocused pattern and the rate at which the surface is scanned is adjusted so that beam 22 heats the surface sufficient to vaporize zinc while minimizing incipient melting of the steel substrate. Vaporization of the zinc is evidenced by a visible plume emanating from pattern 24 and a smut depositing onto adjacent surfaces and equipment. The powdered nickel 28 deposited onto pattern 24 at a rate sufficient to produce a layer 18 having a thickness approximately equivalent to the original zinc coating, about 0.005 inch.

Figure 2:
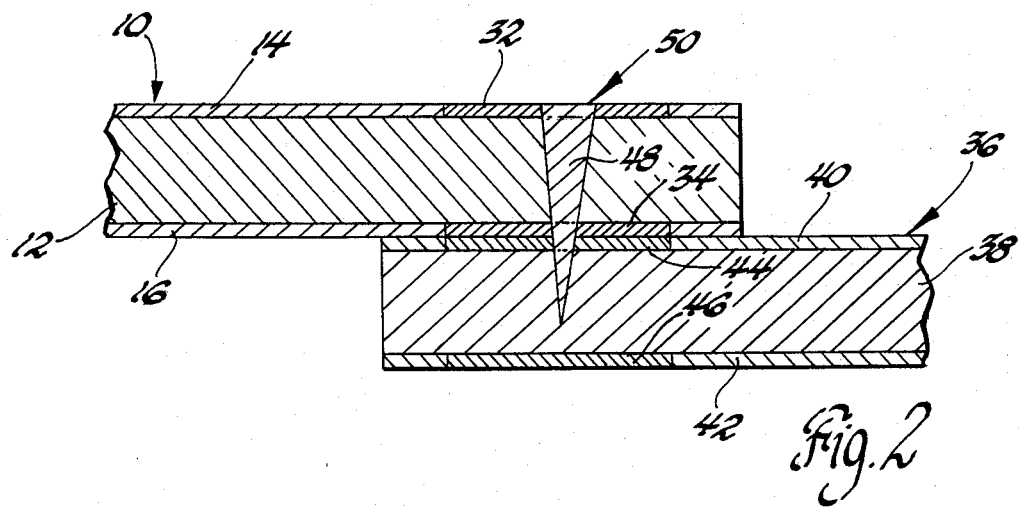
FIG. 2 is an enlarged cross-sectional view, exaggerated for clarity, of a welded lap joint produced in accordance with this invention.

In this manner, a single scan of member 10 produces a single, linear nickel clad track 18. Multiple parallel tracks are applied and overlapped to provide a nickel-base coating 32 for member 10 as shown in FIG. 2. A nickel-base coating 34 is similarly applied to the opposite surface of member 10, replacing zinc coating 16.

Referring to FIG. 2, there is shown a welded joint 50 formed between member 10 having nickel-base coatings 32 and 34 and second member 36 formed of galvanized steel sheet similar to member 10. Member 36 thus comprises a steel substrate 38 carrying zinc coatings 40 and 42 on opposed major faces. In accordance with this preferred embodiment, member 36 is prepared for welding in the manner described for member 10 to substitute nickel-base coatings 44 and 46 for the zinc coatings on opposite surface regions thereof.

For welding, members 10 and 36 are arranged in juxtaposition for forming a lap joint, as shown in FIG. 2. In this arrangement, the faying surfaces of members 10 and 36 include nickel-coated regions 34 and 44, respectively. Nickel-coated region 32 of member 10 is scanned with a laser beam similar to that used in cladding, but focused to produce a deep penetration weld, indicated by nugget 48, which is indicated separately for purposes of illustration, but is integral with the surrounding metal. The weld beam is focused upon the components to produce intense heating that cuts a keyhole in the assembled components and melts the metal about the keyhole. After the beam passes, the molten metal surrounding the keyhole collapses and fuses to produce nugget 48.

Because of the nickel coatings applied to the surface regions affected by the laser welding process, the welded joint is formed in accordance with this invention without violent zinc vaporization, which, if allowed to occur, would create excessive porosity in the product weld. During welding, nickel coatings 34 and 44 at the faying regions melt and fuse with the steel, becoming incorporated into nugget 48. At the beam contact surface, nickel coating 32 is melted. It is believed that after the welding beam passes, this molten nickel flows over the keyhole, accompanied by alloying with the underlying iron, to produce a nickel-enriched surface layer on nugget 48. This nickel-enriched layer is believed to enhance corrosion resistance of the weld. A nickel coating 46 is preferred on the external surface of the member 36, even though not directly exposed to the welding beam, since this region may be heated during welding to a temperature sufficient to vaporize the zinc, whereupon, in the absence of a nickel coating, the underlying steel may be exposed. Similarly, external coating 32 extends about weld 48 to protect adjacent surfaces which, although not heated to fusion temperatures, may be heated to a temperature sufficient to vaporize zinc. Thus, the welded product is protected by a galvanized zinc coating on the majority of its faces and a nickel coating in the heat-affected zone about the weld.

Although in the described embodiment a welded joint is produced between two galvanized steel sheet members, each treated to apply nickel-base coating to opposite surfaces in the weld region, this invention may be suitably applied to produce a welded joint between a zinc-coated component, partially nickel cladded in accordance with this invention, and a nonzinc-coated component.

In the described embodiments, a laser beam is employed for selectively recladding the galvanized surface and for the welding operation. A laser apparatus emits a coherent photon beam characterized by a high energy. Equipment is also available for producing a high energy beam of electron particles, which electron beam may be utilized for recladding or welding in the practice of this invention. In the preferred embodiment, the zinc coating is vaporized and concurrently replaced by a nickel coating in a single scan by the laser beam of the surface. It is believed that a coating formed in this manner may contain zinc either alloyed with the nickel or in the form of dispersed, unvaporized particles. Despite a minor residual zinc content, the nickel-base coating avoids catastrophic porosity such as is found in welds attempted between galvanized zinc coatings. Alternately, the zinc coating may be removed and the nickel coating applied in separate steps, i.e., by scanning twice, to substantially remove the zinc and apply a higher purity nickel coating.

While this invention has been described in terms of certain embodiments thereof, it is not intended that it be limited to the above description but rather only to the extent set forth in the claims that follow.

The embodiments of the invention in which an exclusive property or privilege is claimed are defined as follows:

1. A method for welding a first steel sheet member having a corrosion protective metallic zinc coating on major faces thereof to a second steel member to form a joint therebetween, said first member comprising a faying surface region and a joint-external surface region opposite said faying surface, said method comprising pretreating the first member to selectively remove the zinc coating from the faying surface region and the joint-external surface region thereof and applying a nickel-base coating onto said regions, assembling the members such that the nickel-base coated faying surface region lies adjacent a faying surface region of the second member, said second member faying surface region being substantially free of vaporizable zinc, and welding the assembly by scanning the nickel-base coated joint external surface region of the first member with a high energy density beam to fuse the members at the faying surface to produce a welded joint therebetween, whereby the nickel-base coating on the first member surface regions reduces weld porosity and enhances corrosion resistance of the joint.

2. A method for laser welding first and second galvanized steel sheet members, each member comprising a corrosion protective, thin metallic zinc coating on opposed major faces thereof and having a faying surface region and a joint-external surface region opposite the faying surface region, said method comprising pretreating each said surface region of each member by scanning the region with a laser beam and concurrently injecting a fine nickel powder into the beam to deposit nickel onto the region, said laser beam having an intensity and scanning at a rate sufficient to selectively vaporize the zinc coating from the surface region while minimizing melting of the underlying steel, and further to melt and coalesce the powdered nickel to produce a nickel-base coating on the region, assembling the pretreated members such that the faying region of the first member lies adjacent the faying region of the second member, and welding the assembly by scanning the pretreated external region of the first member with a laser beam having an intensity sufficient to fuse the members at the faying surfaces to form a joint therebetween, whereby the nickel-base coating in the regions during laser welding reduces weld porosity and enhances corrosion resistance of the welded joint.

* * * * *